Oct. 20, 1970

JAMES E. WEBB
ADMINISTRATOR OF THE NATIONAL AERONAUTICS
AND SPACE ADMINISTRATION
ROCKET NOZZLE TEST METHOD
Filed April 30, 1968

3,534,597

INVENTOR.
ELLIS G. ESTES

BY

ATTORNEYS

United States Patent Office 3,534,597
Patented Oct. 20, 1970

3,534,597
ROCKET NOZZLE TEST METHOD
James E. Webb, Administrator of the National Aeronautics and Space Administration, with respect to an invention of Ellis G. Estes, Manhattan Beach, Calif.
Filed Apr. 30, 1968, Ser. No. 725,475
Int. Cl. G01m 15/00
U.S. Cl. 73—116                3 Claims

ABSTRACT OF THE DISCLOSURE

A method of testing a rocket nozzle, of the type having a throat submerged in a motor chamber, at high tensile stress levels. The method comprises briefly operating the rocket motor at higher than usual mass flow rates, until inner and outer portions of the throat walls reach a maximum temperature difference. At this time, the mass flow rate is suddenly lowered. When the mass flow rate is cut, the pressure drops rapidly while the temperature differential decreases only slowly. For a period after the mass flow rate is cut, the thermally induced stresses, which are tensile, are only slightly counteracted by the pressure induced stresses, which are compressive, so that a high net tensile stress level is obtained.

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42. U.S.C. 2457).

BACKGROUND OF THE INVENTION

Field of the invention

This invention relates to methods for testing rockets.

Description of the prior art

The throat area of many high performance rocket nozzles are subjected to high temperatures, such as 5,000° F., and high pressures such as 700 p.s.i. In order to withstand such conditions, the throat areas of high performance nozzles are often constructed of special graphite materials. Reliability testing of the nozzles, and particularly of the throat areas, generally requires the inducing of stresses at a level above those to be encountered in normal use.

In some rocket motor designs, the nozzles are positioned entirely behind the chamber wherein fuel is burned. In the case of such motor designs, higher stress levels can be realized by simply burning fuel at a higher rate. The resultant higher mass flow rate causes a larger pressure within the throat area and a larger temperature grandient between the inner and outer portions of the throat. Both the higher pressure and higher temperature gradient induce higher tensile stresses in the throat material. Therefore, this over-testing method provides a good indication as to the reliability of the nozzle under the lower tensile stresses encountered in normal use.

In many rocket motor designs, the throat of the nozzle is located within the motor chamber wherein fuel is burned. As a result, the outside of the throat is subjected to large compressive forces from the burning gases which have not yet exited from the motor chamber. These pressures induce large compressive stresses in the nozzle throat walls. Such nozzles cannot be subjected to higher tensile stress levels merely by operating the motors at higher mass flow rates. Although the higher mass flow rate causes larger temperature gradients and therefore larger tensile stresses, these higher stresses are counteracted by larger compressive stresses due to the increased chamber pressure. In fact, the net tensile stress is generally lower at higher mass flow rates.

Other methods have been proposed for testing submerged nozzle throats at amplified tensile stress levels. One method is to apply heat shocks to a sample of the same type of material as that used in a nozzle throat to induce large thermal stresses. However, it is questionable whether these tests are a good indication of the performance of the materials in an actual nozzle. Another method involves the use of propellants which burn at an extremely high temperature to increase the tensile stress level without a corresponding increase in compressive stresses from higher chamber pressures. While this method provides a better indication of nozzle reliability than the simple testing of a piece of nozzle material, the special propellants required are often costly to procure. In addition, the different chemical composition of the special propellants can affect the performance of the nozzle material and give erroneous results.

OBJECTS AND SUMMARY OF THE INVENTION

One object of the present invention is to provide a method for inducing large thermal stresses in a rocket nozzle without correspondingly large pressure induced stresses.

Another object is to provide a method for more accurately testing a rocket motor wherein the nozzle throat is submerged within the motor chamber.

In accordance with the present invention, a method is provided for testing rocket nozzles to produce large thermally induced stresses without correspondingly large pressure induced stresses. The method is especially adaptable to the testing of rocket motors wherein the nozzle throat is submerged within the motor chamber. In the case of such nozzles, the method of the invention produces large net tensile stresses in the throat section to test it for reliability.

The method of this invention comprises the initial operation of the rocket motor at a high mass flow rate. This results in rapid heating of the inner surface of the nozzle throat, so that a large temperature differential exists across the thickness of the throat walls, resulting in large tensile stresses. Of course, the high mass flow rate also results in a high pressure with correspondingly high pressure induced stresses. In the case of a submerged throat, the high pressures produce compressive stresses that counteract the thermally induced stresses. However, after a few seconds, when the thermal gradient in the nozzle walls has almost reached a maximum level, the mass flow rate is cut to a low level.

The pressure of the gaseous fluid on the nozzle throat drops rapidly as the mass flow rate is rapidly lowered. However, the thermal gradient decreases at a substantially lower rate. During the time when the pressure is at a low level but the thermal gradient is still very large, the tensile stresses in the nozzle throat are at a maximum level. If a high mass flow rate is used, the tensile stresses existing immediately after the mass flow rate is cut are substantially higher than the levels which can be achieved during continuous operation at any constant mass flow rate. The ability of the nozzle to withstand these high tensile stresses is a good indication that the nozzle will reliably withstand the lower net tensile stresses encountered under normal use conditions.

The invention will best be understood from the following description when read in conjunction with the accompanying drawings.

DESCRIPTION OF THE PREFERRED EMBODIMENTS

Figure 1:
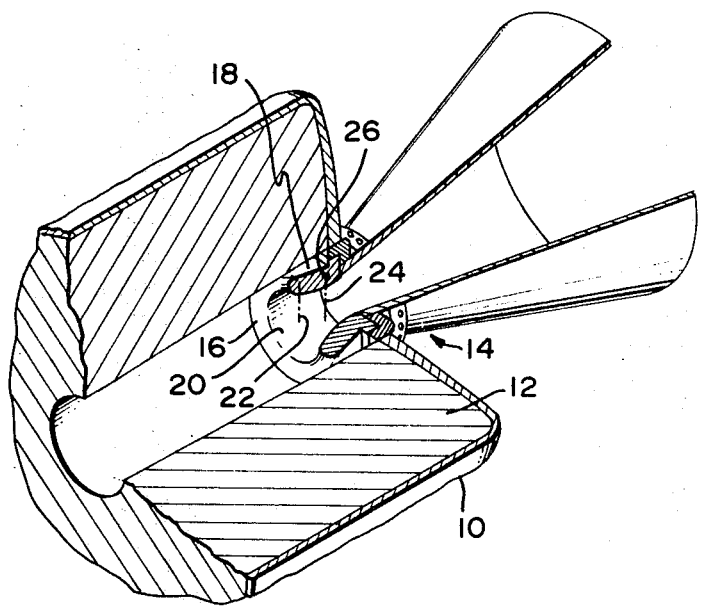
FIG. 1 is a sectional perspective view of the rear portion of a rocket motor, showing a typical rocket nozzle which can be tested by the method of the present invention.

FIG. 1 illustrates a rocket motor for which the test method of the present invention is particularly useful. The motor comprises a motor case 10 which contains a solid propellant 12. A nozzle assembly 14 is located at the aft end of the rocket, and has a throat insert 16 disposed within the motor case. The location of the throat insert 16 results in its outer surface 18 receiving the gas pressure produced by the burning propellants before they pass through the inner surface 20 of the throat section. These pressures on the outer throat surface decrease the tensile stresses on the throat insert, thereby increasing its reliability. However, this has heretofore also resulted in increased difficulty in reliability testing.

The stresses induced in the nozzle insert 16 come from several sources. When the rocket motor is started, all portions of the nozzle insert 16 are at ambient temperature. The rush of the hot gases through the throat rapidly heats the inner surface 20 of the throat insert. The outer surface 18 is also heated, though at a substantially lower rate. The heating of the insert 16 produces tensile stresses due to expansion. Also, tensile stresses of a high order of magnitude are produced by reason of the thermal gradient resulting from the extremely rapid heating of the inner surface 20.

Counteracting the thermally induced tensile stresses in the throat insert 16 are compressive stresses caused by the high pressure of the burning gases. The burning fuel produces a large pressure on the outer surface 18 of the nozzle. A substantially lower pressure exists at the inner surface 20 because of the high velocity of the gases flowing therethrough. The pressure at the narrowest part of the throat insert 16 is only approximately 60% of the pressure at the outer surface 18. The compressive stresses resulting from the pressure of gases lowers the nozzle stresses to a moderate tensile stress level.

Typical operating conditions of high performance rocket motors result in temperatures at the inner surface 20 on the order of 5,000° F. and gas pressures on the outer surface 18 of approximately 700 p.s.i. Higher performance rocket motors often use graphite material for the throat insert 16 to withstand these conditions. Such materials have relatively low tensile strengths on the order of 2,000 to 3,000 p.s.i., and failure is most likely to occur from high tensile stresses. The graphite materials are generally stronger at higher temperatures, so it is actually the cooler portions of the nozzle, that is, the portions near the outer surface 18, that are weakest in operation. The highest tensile stresses occur in two planes perpendicular to the center line of the nozzle, these being the planes indicated by the lines 22 and 24. A location 26 in the plane indicated by line 24, and between the inner and outer surfaces of the nozzle, is where the nozzle is most likely to fail under the high tensile stresses on the order of 3,000 p.s.i. produced during operation.

An important test of rocket motor nozzle reliability is a test wherein the throat insert 16 is subjected to tensile stresses of a higher level than are encountered in normal flight use. This is because the failure of the throat insert under tensile stress is one of the most likely causes of failure. It might be expected that the tensile stresses can be increased by merely operating the rocket motor at a higher mass flow rate. However, a higher mass flow rate does not result in higher tensile stresses at the throat insert for submerged nozzles.

As the mass flow rate increases, and more gas flows through the nozzle, the convective heat transfer to the throat (which is the primary means of heating) increases by the 0.8 power of the pressure. Because of the thermal response of the throat material, this heating increases the tensile stress in the throat insert. However, the pressure loading increases by the 1.0 power of the pressure within the rocket case, producing compressive stresses that offset the increased tensile stress. The pressure induced stresses increase at a higher rate (the 1.0 power) than the rate of increase of tensile stresses (the 0.8 power), so that the net tensile stresses actually decrease for higher mass flow rates.

In accordance with the invention, large tensile stresses are produced in the throat insert 16 by initially operating the rocket motor at a high mass flow rate, generally one which exceeds the rate used in normal flight. This results in rapid heating of the inner surface of the nozzle throat, producing large temperature differentials and correspondingly large thermally induced stresses. Of course, the compressive stresses produced by the high pressure counteract the thermal stresses, and generally produce a net stress which is somewhat below the level encountered in flight operations.

After several seconds of operation, when the thermal differential and corresponding thermally induced stresses reach nearly a maximum level, the mass flow rate is suddenly cut from the high range shown prior to time $t_1$ to the low range which is reached a short time thereafter. The mass flow rate generally is not reduced to zero, because the resultant net tensile stresses may far exceed the capability of the throat material, thus causing nozzle failure, and preventing achievement of the test objectives. If a maximum tensile stress level is desired, however, the mass flow rate may be cut to zero. The cut in mass flow rate results in a rapid drop in pressure, but not in temperature differential so that the net tensile stress becomes very large for a brief period.

Figure 2:
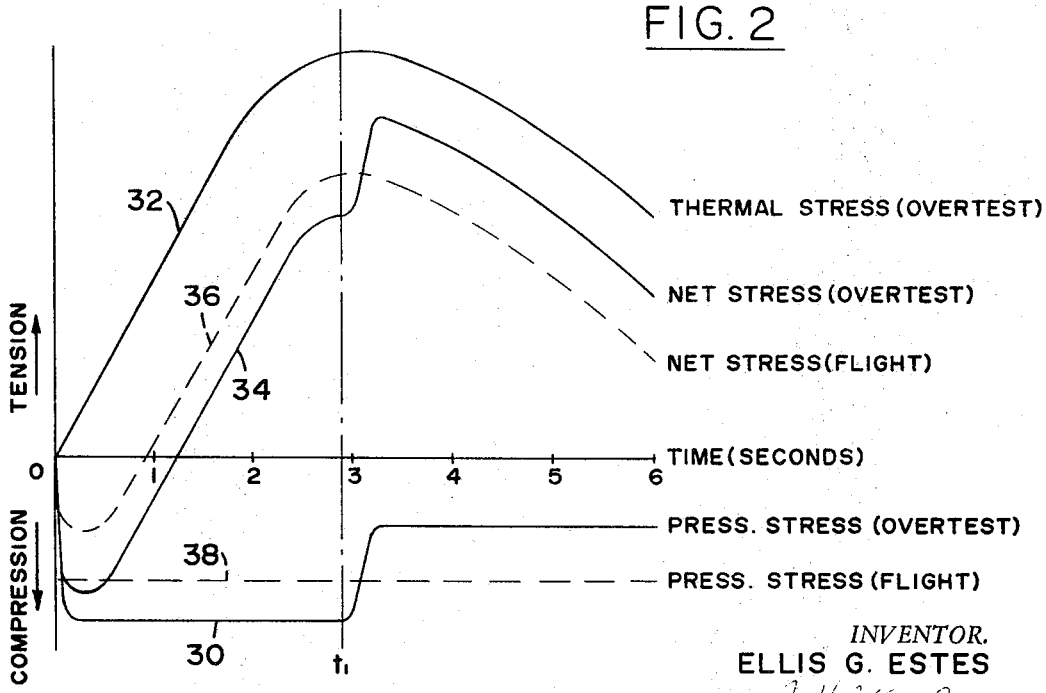
FIG. 2 is a graph showing stresses produced at an inner area of the nozzle of FIG. 1.

FIG. 2 is a graph showing the stress levels produced in a typical nozzle portion during an over-test, when the mass flow rate is initially higher than the rate to be used during a typical flight. The location 26 in the throat insert represents one such critical area which is among those most likely to fail by tensile stresses. When the motor is started, the gas pressure rises to a high level in a very short period. As a result, the pressure induced stress level indicated by the graph line 30 reaches an appreciable level during a short period of time. The pressure induced stresses produced in the critical area of the throat are initially compressive, and therefore are shown at a level below the zero stress level. As the gases move through the throat, the inner surface 20 is rapidly heated, resulting in thermally induced stresses shown by the graph line 32, these stresses being tensile. The net stress, shown by the graph line 34 is equal to the difference between the pressure induced and thermally induced stresses.

The thermally induced stresses, indicated by line 32, rise to a higher absolute magnitude than the pressure induced stresses, so that the net stress shown by line 34 becomes tensile after a short period of operation. The dashed line 36 indicates the net stress level under normal use conditions when the pressure is at the level shown by line 38. It can be seen that the net stress shown by line 34 during the first period of the overtest is lower than the net stress of line 36 for a normal mass flow rate. The initially lower net stress shown at 34 is due to the fact that the increase in mass flow rate over the normal mass flow rate results in a greater increase in pressure induced (compressive) stress than the thermally induced (tensile) stress.

The thermally induced stresses are dependent primarily upon the temperature gradient within the throat section. After a brief period of operation, the thermal gradient, and therefore the thermal stresses, reach a maximum and begin to decline. FIG. 2 shows the stress variation in the operation of a medium size nozzle having a minimum throat diameter of approximately 2 inches and a wall thickness at the throat of approximately 1 inch, wherein the maximum thermal stress was reached after approximately 3 seconds of operation. At a time $t_1$ which is just prior to the time of maximum thermal stress, the mass flow rate is suddenly cut to a low level. The pressure induced stresses 30 quickly drop to a low level. However, the thermally induced stresses 32 do no change rapidly. As a result, the net stress 34 increases so that a large tensile stress is produced in the throat insert. For a certain time period, the net stress 34 during the overtest exceeds the maximum net stress 36 produced during normal flight operation. If the nozzle insert does not fail during this critical period, there is a strong indication that it will perform reliably in normal flight use.

Although particular embodiments of the invention have been described and illustrated herein, it is recognized that modifications and variations may readily occur to those skilled in the art, and, consequently, it is intended that the claims be interpreted to cover such modifications and equivalents.

What is claimed is:

1. A method for testing apparatus which is subjected to hot fluids under pressure, to establish high thermal stresses without correspondingly high pressure induced stresses comprising:

initially subjecting said apparatus to said hot fluid while said fluid is at a high pressure which is greater than the maximum pressure of fluid to which said apparatus is subjected under normal use conditions; and decreasing the pressure of said fluid at said apparatus, at a rate substantially greater than the rate of change of thermal stresses, beginning at a time when the thermal stresses are at a high level, and continuing the decrease of said pressure only to a level which is substantially above zero.

2. A method for testing a rocket motor having a nozzle throat portion whose outer surface is subjected to the high pressure gases which power the motor comprising:

operating said motor at a mass flow rate within a first range; and rapidly reducing said mass flow rate to a second range that is substantially above zero, beginning at a time near the time of maximum thermally induced stresses at predetermined portions of said nozzle throat portion.

3. A method for testing apparatus which is subjected to hot fluids under high pressure, and which has thermally induced stresses which reach a maximum level a predetermined time after subjection to said hot fluids under said high pressure, said thermally induced stresses thereafter declining from said level, to establish high thermal stresses without correspondingly, high pressure induced stresses, comprising:

initially subjecting said apparatus to said hot fluid while said fluid is at high pressure, until a time when the thermal stresses established in said apparatus are at a high level; and decreasing the pressure of said fluid at said apparatus, at a rate substantially greater than the rate of change of thermal stresses, beginning at a time when said thermally induced stresses are near said maximum level.

References Cited
UNITED STATES PATENTS 3,112,614  12/1963  Ellenberg et al. ___ 239—591 X
3,265,314  8/1966  Helms et al. _____ 239—128 X JERRY W. MYRACLE, Primary Examiner U.S. Cl. X.R.

73—15.6, 49.7